(12) United States Patent
Madau

(10) Patent No.: US 7,027,920 B2
(45) Date of Patent: Apr. 11, 2006

(54) LOW-SPEED COLLISION AVOIDANCE SYSTEM

(75) Inventor: Dinu Petre Madau, Dearborn, MI (US)

(73) Assignee: Visteon Global Technologies, Inc., Van Buren Township, MN (US)

( * ) Notice: Subject to any disclaimer, the term of this patent is extended or adjusted under 35 U.S.C. 154(b) by 160 days.

(21) Appl. No.: 10/622,342

(22) Filed: Jul. 18, 2003

(65) Prior Publication Data

US 2005/0040983 A1 Feb. 24, 2005

(51) Int. Cl.
*G01C 7/00* (2006.01)

(52) U.S. Cl. ............... 701/301; 340/435; 180/167; 180/170

(58) Field of Classification Search ........ 701/300–302; 340/425.5, 435, 436, 901, 903, 904; 180/232, 180/167–171
See application file for complete search history.

(56) References Cited

U.S. PATENT DOCUMENTS

| | | | |
|---|---|---|---|
| 4,947,952 A | 8/1990 | Kajiwara | |
| 5,598,164 A | 1/1997 | Reppas et al. | 342/70 |
| 5,754,123 A | 5/1998 | Nashif et al. | 340/903 |
| 5,864,285 A | 1/1999 | Wieder et al. | 340/435 |
| 5,931,547 A | 8/1999 | Lerner | 303/193 |
| 5,952,939 A | 9/1999 | Nakazawa et al. | 340/903 |
| 6,006,144 A | 12/1999 | Takahashi et al. | 701/1 |
| 6,044,321 A | 3/2000 | Nakamura et al. | 701/96 |
| 6,084,508 A | 7/2000 | Mai et al. | 340/463 |
| 6,105,705 A | 8/2000 | Faye | 180/275 |
| 6,267,194 B1 | 7/2001 | Bullinger et al. | 180/275 |
| 6,342,821 B1 | 1/2002 | Kim | 332/104 |
| 6,342,832 B1 | 1/2002 | Fuchs et al. | 340/436 |
| 6,836,717 B1 * | 12/2004 | Buechele et al. | 701/45 |

FOREIGN PATENT DOCUMENTS

| | | |
|---|---|---|
| GB | 2 309 555 | 7/1997 |
| WO | 93/24894 | 12/1993 |

OTHER PUBLICATIONS

Patents Act 1977: Combined Search and Examination Report under Sections 17 and 18(3) dated Sep. 20, 2004.

* cited by examiner

*Primary Examiner*—Yonel Beaulieu
(74) *Attorney, Agent, or Firm*—Brinks Hofer Gilson & Lione

(57) ABSTRACT

A system and a method for low speed collision avoidance by a vehicle are provided. The low speed collision avoidance system includes an operation control module in communication with a plurality of signal generators for determining a distance to an object, a vehicle velocity, an accelerator position, a brake switch position and a shift position to effect vehicle operation. The system and the method for low speed collision avoidance operate when the vehicle is traveling below a predetermined low velocity and when the vehicle is stopped.

18 Claims, 3 Drawing Sheets

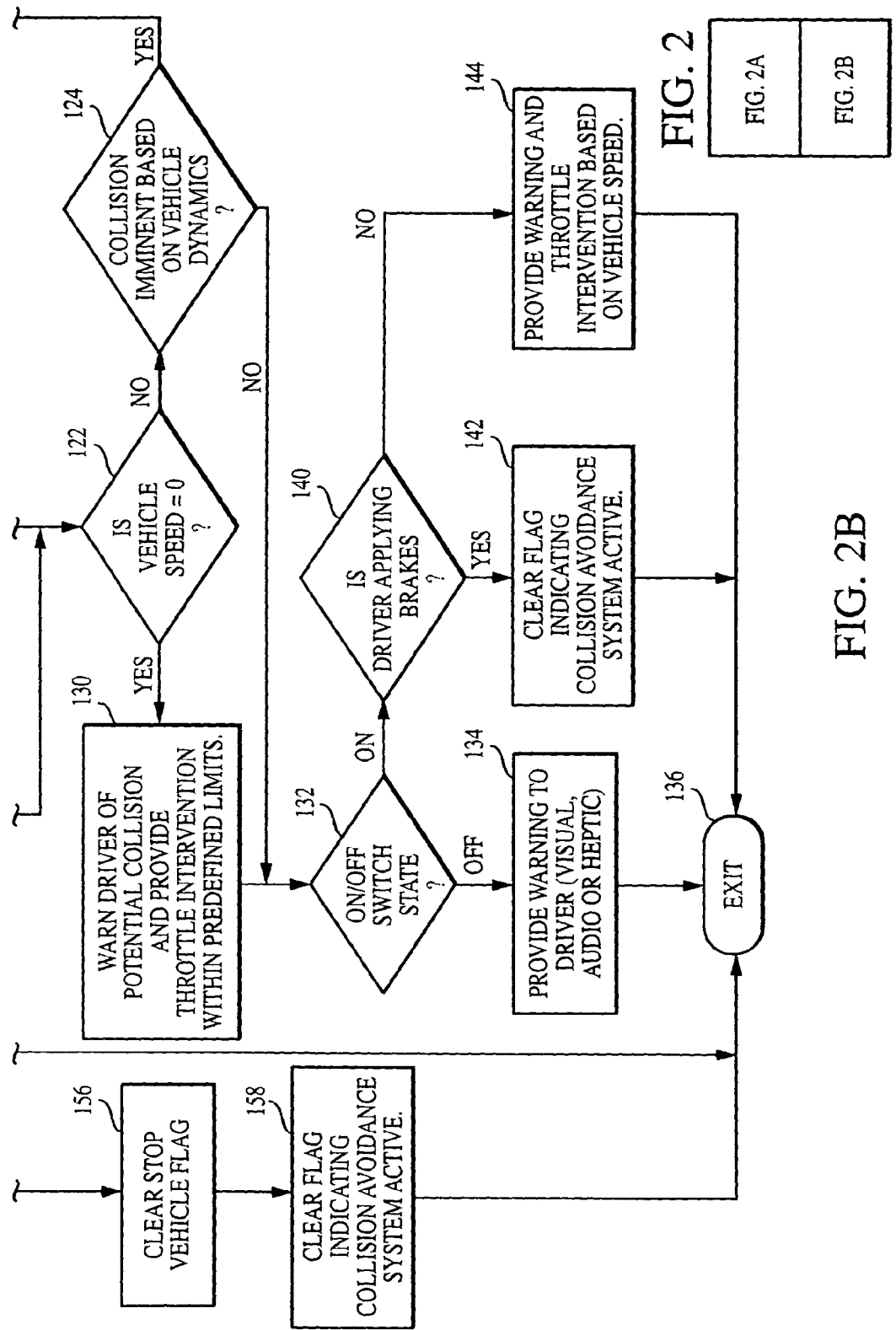

LOW-SPEED COLLISION AVOIDANCE SYSTEM

BACKGROUND

1. Technical Field

The present invention generally relates to a low speed collision avoidance system. In particular, the low speed collision avoidance system includes a control module that effects vehicle operation below a predetermined low velocity and when the vehicle is stopped.

2. Background Information

Collisions between a vehicle and an object or another vehicle often occur when a vehicle is traveling at a low speed or when the vehicle is beginning to move from a stopped position. For example, a collision may occur while a person is driving in high congestion traffic at low speeds. Frequent emergency braking situations arise. If the driver is temporarily preoccupied and fails to apply the brake when the vehicle in front is stopped, a collision occurs. A collision may also arise when a driver, in a parked vehicle, accidentally shifts the vehicle to drive instead of reverse or reverse instead of drive and then presses the accelerator and causes the vehicle to proceed into an object that the driver was aware of, but did not anticipate hitting. Alternatively, collisions may occur both at low speed and when leaving a parking situation when the driver does not see an object that is in the path of the traveling vehicle.

Conventional collision protection systems have provided warnings for objects detected in the rear of a vehicle when the vehicle is backing up. Other conventional systems provide an indication of the distance to an object when the vehicle is traveling at a high velocity, such as provided in an adaptive cruise control system. The present invention will provide a system for prevention of vehicle collision both when the vehicle is being operated by a driver at low speed in the forward or reverse direction and when the driver is beginning to move the vehicle from a stopped position.

BRIEF SUMMARY

In order to alleviate one or more shortcomings of the prior art, a vehicle system and method for low speed collision avoidance are provided herein.

According to one aspect of the present invention, there is provided a vehicle system for low speed collision avoidance. The system comprises a vehicle operation control module in communication with a plurality of signal generators for indicating a distance to an object, a vehicle velocity, an accelerator position, a brake switch position, a shift position and a distance selection by an operator for said system to effect vehicle operation. The system operates both when the vehicle is traveling below a predetermined low velocity and when the vehicle is stopped.

In another aspect of the present invention, there is provided a method for avoiding a low speed collision by a vehicle. The method includes the steps of providing an operation control module linked to a plurality of signal indicators in said vehicle, determining a distance to an object, determining a vehicle velocity, determining an accelerator position, determining a brake switch position and determining a shift position, determining a distance selected by an operator for said system operation and providing signals indicative of the determinations to an operation control module. A vehicle control signal is generated based on the signals provided to the operation control module determinations to effect vehicle operation. The system operates both when the vehicle is traveling below a predetermined low velocity and when the vehicle is stopped.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
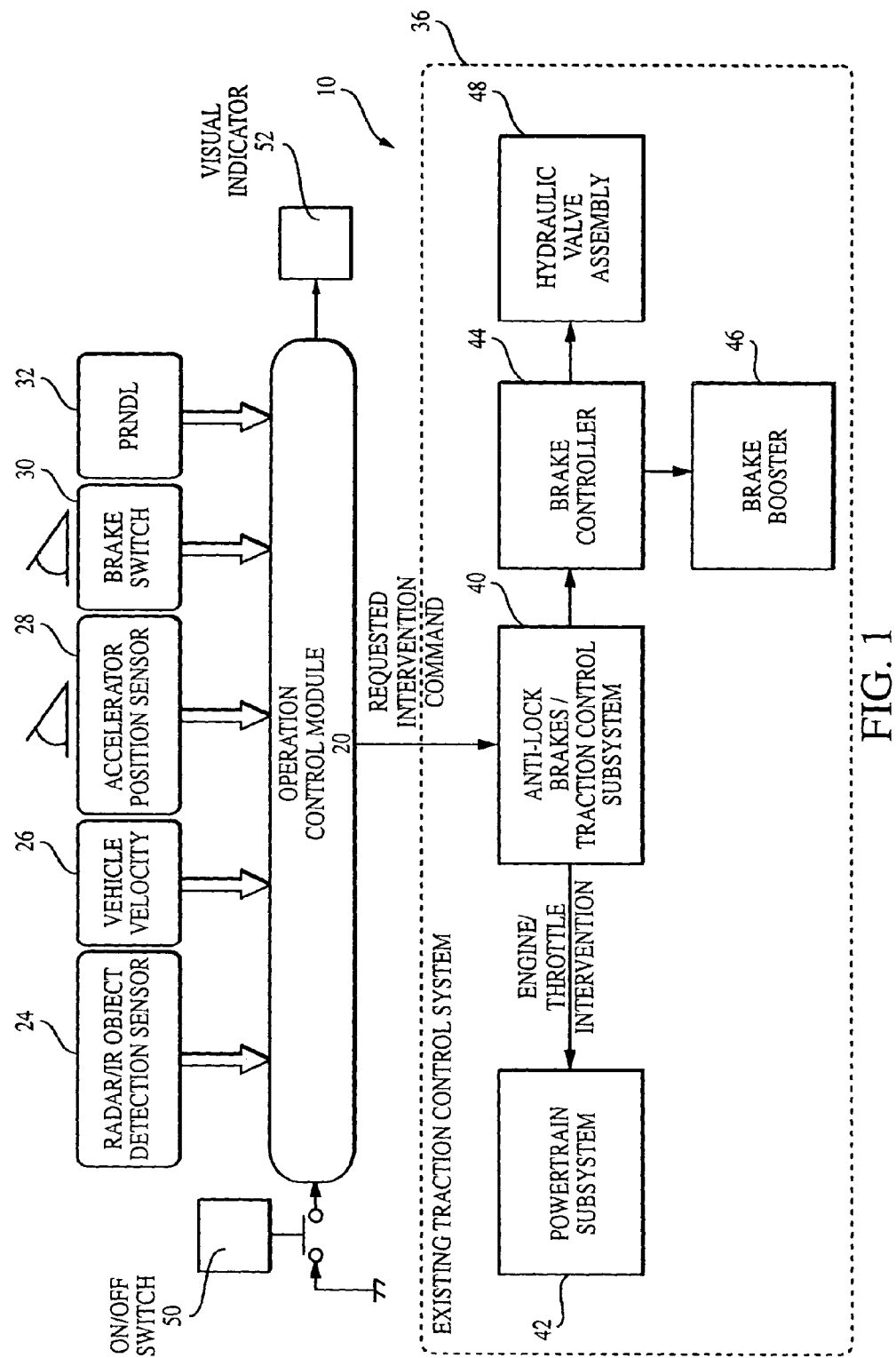
FIG. 1 is a block diagram of the collision avoidance control module in accordance with the present invention.

FIG. 1 illustrates a preferred embodiment of a low speed collision avoidance system 10 of the present invention. The system 10 comprises an operation control module 20 that receives a plurality of signals to provide information to the control module 20 to effect vehicle operation. The plurality of signals sent to the control module 20 include signals from an object detection sensor 24, a vehicle velocity sensor 26, an accelerator position sensor 28, a brake switch sensor 30 and a shift position sensor 32. The sensors may be any type of sensor well known in the art. In a preferred embodiment, the control module 20 uses the information from the plurality of signals from the sensors to effect vehicle operation using an existing vehicle control system 36. In a preferred embodiment, the existing vehicle control system 36 is implemented in an automatic cruise control system, although the system 20 may be located and associated with any control system within the vehicle. The vehicle control system 36 includes an antilock brake system and traction control system 40 (ABS/TCS), a powertrain subsystem 42 and a brake control system 44. The brake system 44 further comprises a brake booster 46 and a hydraulic valve assembly 48.

The control module 20 further includes a switch 50 and an indicator 52. The operator may use the switch 50 to manually set the distance zone at which the system 10 operates. In a preferred embodiment, the operator may set the distance to be in the range of about 0.1 meters to about 3 meters. The system 10 may retain the operator selected distance zone from key on to key on operation of the vehicle. The operator may also use the switch 50 to override the collision avoidance system 10 by switching the system 10 off, thereby allowing the operator to proceed into the object detected by the sensor 24. The indicator 52 alerts the operator that the control system 10 is activated and that an object is detected by the sensor 24. In the preferred embodiment, the indicator 52 may not be overridden by the operator. The indicator 52 may be any type of indicator known in the art, including visual audio or haptic indicators.

Optionally, the system may include a signal generator to provide information to the control module 20 regarding the coefficient of friction of the surface on which the vehicle is traveling. For example, a signal from a coefficient of friction sensor 34 may be sent to the control module 20 indicating that the surface on which the vehicle is traveling is slippery due to moisture or ice, thereby indicating that a greater distance is required in which to stop the vehicle to prevent the vehicle from colliding with the object detected by the sensor 24. The control module 20 may effect vehicle operation at a greater distance away from a detected object when the sensor 34, indicating the coefficient of friction of the surface, sends a signal that indicates that conditions of the surface require a greater stopping distance to avoid a collision between the vehicle and the object detected by the sensor 24.

The system 10 operates to avoid collision between a vehicle and an object when the vehicle is moving at a predetermined low velocity (described below) and when the vehicle is stopped. Depending on the vehicle velocity and the distance between the vehicle and the object to avoid, the control module 20 effects vehicle operation using the ABS/TCS 40 which in turn controls the powertrain subsystem 42 and the brake control system 44. In a preferred embodiment, the system 10 is disabled when the vehicle velocity is greater than the predetermined low velocity for a given vehicle. For example, when the vehicle velocity is greater than about 5 mph, the system 10 is disabled.

The system 10 operates when the module 20 receives the plurality of signals generated from the sensors 24 to 32 and then, based on the information from the plurality of signals 24 to 32, effects engine operation. The signal generated from the object distance sensor 24 may include a plurality of signals generated from distance sensors located in various positions on the vehicle. Preferably, the control module utilizes distance sensors that are already implemented in systems currently in use on the vehicle. For example, a signal may be transmitted to the control module 20 from the object distance sensor 24 that is generated by an existing radar system used for detecting objects in front of the vehicle such as a cruise control radar system. The radar system detects objects in front of the vehicle from about 0 to 150 meters, although other distances may be detected.

A signal may be transmitted to the object detection sensor 24 from an existing sensor in the rear of the vehicle. For example, an ultrasonic sensor already in use in the rear of the vehicle may be used to generate a signal to be sent to the control module 20 from the object detection sensor 24. The sensor 24 may use an existing ultrasonic sensor in the rear of the vehicle that detects objects at a distance from about 0 to 3 meters from the rear of the vehicle. Additional sensors to detect objects on the sides of, beneath or above the vehicle may also be used to generate an object detection signal 24 transmitted to the control module 20. Any type of distance detection sensor, known in the art, may be used to detect a distance to an object from the vehicle, in any direction, and generate a signal 24 indicative of the distance from the vehicle to the object detected to the control module 20, such as, a radar, ultrasonic, or laser beam sensors or any combination of sensor thereof.

The signal generated from the vehicle velocity sensor 26 communicates a signal indicative of the speed at which the vehicle is moving, either in a forward or reverse direction. Alternatively, a signal may be generated indicating that the vehicle is not moving. In a preferred embodiment, the control system 10 operates below a predetermined velocity for a given vehicle. For each type of vehicle, a predetermined velocity is chosen below which the collision avoidance control system 10 operates. The speed below which the control system 10 begins to operate may be determined based on a plurality of conditions described below in connection with the ABS/TCS 40.

A preferred embodiment allows the control system 10 to operate at a speed at which the vehicle does not become destabilized when the system 10 operates. For example, the driver of the vehicle should not experience the feeling of loss of steering control. In a preferred embodiment, the braking control system 44 applies the brakes with a maximum force allowable by the braking system. The system 10 may operate when the velocity, determined by the sensor 26, is below the velocity at which the ABS/TCS 40 begins to signal to the brake control system 44 to apply variable intermittent brake pressure if the vehicle is destabilized by the application of the ABS/TCS. Alternatively, the ABS/TCS 40 may be used by the system 10 of the vehicle when the vehicle is stable during the application of the ABS/TCS 40. For example, on ice, the ABS/TCS 40 may provide shorter stopping distance, while maintaining vehicle stability, than is provided by the braking control system 44 without the ABS/TCS 40.

In the preferred embodiment, the control module 20 may signal to the ABS/TCS 40 for the braking control system 44 to apply the maximum brake pressure without invoking the variable pressure application of the anti lock brake system or the implementation of the traction control system 40 wherein the operator experiences the sensation of loss of control of the vehicle. The system 10 operates to avoid collision when the vehicle is in motion at low velocity through the application of the maximum braking pressure to stop the vehicle. The brake control system 44 may operate through a booster command to a brake booster 46 to apply the maximum braking pressure. Alternatively the brake control system 44 may operate through valve commands to a hydraulic valve assembly 48. The brake control system 44 may use the brake booster 46 or the hydraulic valve assembly or both to apply sufficient braking pressure to stop the vehicle to avoid collision with an object. As described above, the predetermined velocity is based on determination for each vehicle, of a speed below which the operator experiences almost no destabilization of the vehicle or loss of steering control. The speed may be, for example, about 5 mph and below. Of course, other predetermined speeds below which the system 10 operates are possible, depending on the vehicle.

The accelerator position sensor 28 and the brake switch 30 indicate driver operations to the control system 20. The shift position sensor 32 indicates whether the vehicle is in park, reverse, drive or low. When the shift position sensor 32 indicates that the vehicle is in drive or low, the object detection sensor 24 is operational in the front of the vehicle. When the shift position sensor 32 indicates that the vehicle is in reverse, the object detection sensor 24 is operational in the rear of the vehicle. The sensor 24 may also transmit signal for the detection of objects on the sides, beneath or above the vehicle for all positions of the shift position sensor 32.

In another embodiment, the system 10 may be used in a vehicle having a manual transmission. The system 10 operates in the manual transmission vehicle similar to an automatic transmission vehicle, the manual transmission having a plurality of signal generators 24 32 and using an existing vehicle control system 36. The shift position indicator 32 will indicate the forward gears, neutral and reverse.

Figure 2A:
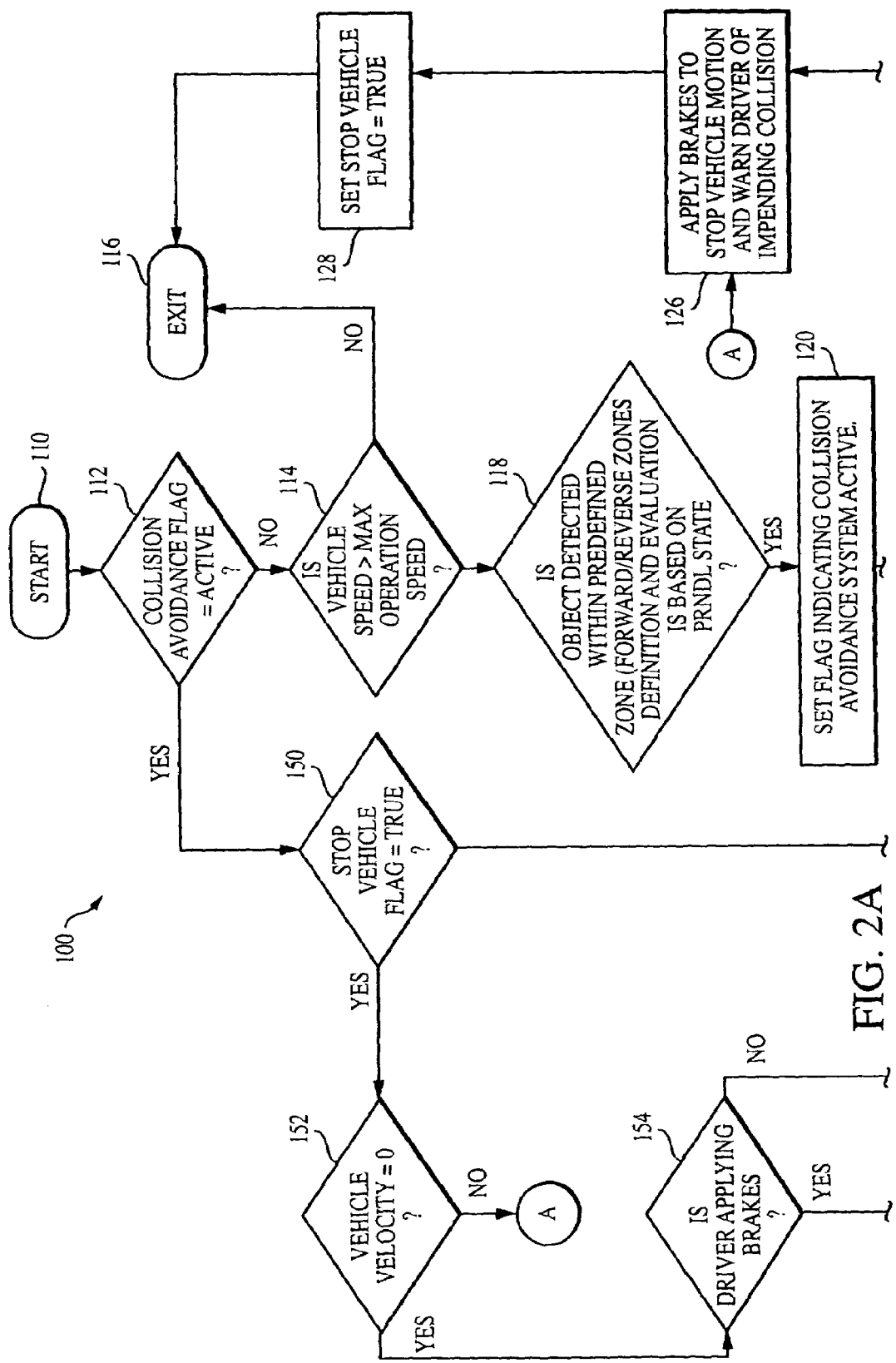
FIG. 2 is a logic flow diagram for the collision avoidance control module in accordance with the present invention.

The control module 20 may use an algorithm 100 to implement the vehicle collision avoidance system 10. A preferred implementation of the control steps performed by the algorithm 100 is shown in the logic flow chart diagrammed in FIG. 2. The algorithm 100, in a preferred embodiment of the present invention, reevaluates the logic loop within 100 milliseconds.

The algorithm 100 begins when an engine is turned on 110. Next, a determination 112 is made whether the collision avoidance system 10 is active. If the system 10 is not active, a vehicle speed 114 is determined and compared to a maximum operational speed for the control system 10. If the speed 114 is greater than the maximum operational speed for the system 10, the algorithm 100 is exited at 116.

If the vehicle speed 114 is not greater than the maximum operational speed for the control system 10, a determination at 118 is made if an object is detected within the zone of operation for the system 10. In a preferred embodiment, the zone of operation for the system 10 is from about 0.1 meters to about 3 meters. If the operator has manually selected a distance for the zone of operation, the determination at 118 is made whether an object is detected within the operator selected zone of operation. As discussed above, in a preferred embodiment of the present invention, the operator may manually select the distance for the zone of operation for the system 10 to be in the range of about 0.1 meters to about 3 meters. If an object not detected or is not determined at 118 to be within the zone of operation, the algorithm 100 is exited at 116. If an object is detected and determined at 118 to be within the zone of operation for the system 10, the system 10 is activated at 120.

When the system is activated at 120, a determination is made whether the vehicle speed 122 is equal to 0 mph. If the vehicle speed 122 is not equal to 0 mph, the algorithm 100 determines if a collision 124 is imminent with the object detected at 118, based on the vehicle dynamics, such as velocity and/or longitudinal acceleration. If the collision 124 is imminent, braking is applied at 126 by the brake control system 44 to stop the vehicle and a warning is sent to the operator by the indicator 52. Next the control system 10 determines that the vehicle is stopped at 128 and the algorithm is exited at 116.

If the vehicle speed 122 is equal to 0 mph, throttle intervention 130 is applied by the ABS/TCS 40 and a warning is sent to the operator by the indicator 52. Next, a determination is made of an override switch position 132 for the system 10. If the override switch position 132 is determined to be off, a warning 134 is provided to the operator of the vehicle by the indicator 52 and the algorithm 100 is exited at 136. The operator may proceed toward the object without intervention of the system 10 when the override switch position 132 is in the off position. If the override switch position 132 is determined to be in the on position, a determination is made whether the operator is applying the brakes 140. If the operator is applying the brakes 140, a collision avoidance system activation signal 142 is cleared and the algorithm 100 is exited at 136. If the operator is not applying the brakes at 140, a throttle intervention 144 is provided based on the speed of the vehicle and a warning is sent to the operator by the indicator 52, in a preferred embodiment of the present invention, the speed range for operation may me set from 0 to about 6 miles per hour. Once the throttle intervention 144 occurs and a warning 134 is provided, the algorithm 100 is exited at 136.

If the collision is determined not to be imminent at 124, the algorithm 100 proceeds to determine the override switch position 132. The algorithm 100 proceeds from the override switch position determination 132 as described above.

If the collision avoidance system 10 is determined at 112 to be active, a determination is made whether be vehicle is stopped at 150. If the vehicle is not stopped at 150, the determination is made whether the vehicle speed 122 is equal to 0 mph. The algorithm 100 proceeds from the vehicle speed determination 122 as described above.

If the vehicle is determined to be stopped at 150, a determination is made whether the vehicle speed 152 is equal to 0 mph. If the vehicle speed 152 is not equal to 0 mph, braking is applied 126 by the brake control system 44 to stop the vehicle and a warning is sent to the operator by the indicator 52. The algorithm 100 proceeds from the brake application 126 as described above.

If the vehicle speed 152 equals 0 mph, a determination is made whether the driver is applying the brakes at 154. If the driver is not applying the brakes at 154, the algorithm 100 is exited at 136. The ABS/TCS 40 is applying the brakes automatically when the vehicle is stopped. If the driver is applying the brakes at 154, an indicator 156 that indicates that the vehicle is stopped is cleared. Next, a collision avoidance system activation signal 158 is cleared and the algorithm 100 is exited at 136.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims. The scope of the invention is defined by the appended claims, and all devices that come within the meaning of the claims, either literally or by equivalence, are intended to be embraced therein.

The invention claimed is:

1. A vehicle system for low speed collision avoidance, the system comprising:
   a vehicle operation control module;
   at least one first signal generator for indicating a distance of at least one object from the vehicle, in communication with said control module;
   a second signal generator for indicating a vehicle velocity, in communication with said control module;
   a third signal generator for indicating an accelerator position, in communication with said control module;
   a fourth signal generator for indicating a brake switch position, in communication with said control module;
   a fifth signal generator for indicting a shift position, in communication with said control module; and
   a sixth signal generator for indicating a distance zone selected by an operator for an operational distance for said system;
   wherein said vehicle operation control module effects vehicle operation based on information from said signal generators when said vehicle is traveling below a predetermined low velocity and when said vehicle is stopped.

2. The vehicle system of claim 1 wherein said distance zone further comprises said operational distance in the range from about 0.1 meters to about 3 meters.

3. The vehicle system of claim 1 wherein said distance zone selected further comprises key on to key on memory.

4. The vehicle system of claim 1 wherein said system further comprises an anti lock brake/traction control system operably connected to said control module to effect vehicle operation when said vehicle is traveling below said predetermined low velocity.

5. The vehicle system of claim 1 wherein said system further comprises a powertrain control system operably connected to said control module for throttle intervention.

6. The vehicle system of claim 5 wherein said system further comprises a braking control system operably connected to said anti lock brake/traction control system.

7. The vehicle system of claim 1 further comprising a system override switch operably connected to said control module.

8. The vehicle system of claim 1 further comprising a seventh signal generator for detecting the coefficient of friction of the surface on which said vehicle is traveling, operably connected to said control module.

9. The vehicle system of claim 1 wherein said predetermined low velocity is below about 5 mph.

10. The vehicle system of claim 1 wherein said control module further stores and runs at least one algorithm for determining a mode of vehicle operation.

11. The vehicle system of claim 1 further comprising a warning indicator operably connected to said control module.

12. A method for avoiding a low speed collision in a vehicle, said method comprising the steps of:
providing an operation control module linked to a plurality of signal indicators in said vehicle;
determining a distance of at least one object from said vehicle and providing a signal indicative thereof to said operation control module;
determining a vehicle velocity and providing a signal indicative thereof to said operation control module;
determining an accelerator position and providing a signal indicative thereof to said operation control module;
determining a brake switch position and providing a signal indicative thereof to said operation control module;
determining a shift position and providing a signal indicative thereof to said operation control module;
determining a zone of operation selected by an operator for operation of said system operation; and
generating a vehicle control signal in said control module to effect vehicle operation when said vehicle is traveling below a predetermined low velocity and when the vehicle is stopped, based on said signals.

13. The method of claim 12 further comprising the step of selecting a zone of operation for the system in the range of about 0.1 meters to about 3 meters.

14. The method of claim 12 further comprising the step of controlling vehicle operation using braking intervention.

15. The method of claim 12 further comprising the step of controlling vehicle operation using throttle intervention.

16. The method of claim 12 further comprising the step of determining a coefficient of friction of a surface on which the vehicle is traveling.

17. The method of claim 12 further comprising the step of effecting vehicle operation running an algorithm.

18. A vehicle system for low speed collision avoidance, said vehicle system comprising:
an operation control module linked to a plurality of signal indicators in said vehicle;
means for determining a distance of at least one object from said vehicle and providing a signal indicative thereof to said operation control module;
means for determining a vehicle velocity and providing a signal indicative thereof to said operation control module;
means for determining an accelerator position and providing a signal indicative thereof to said operation control module;
means for determining a brake switch position and providing a signal indicative thereof to said operation control module;
means for determining a shift position and providing a signal indicative thereof to said operation control module; means for selecting a zone of operation of said system; and
means for generating a vehicle control signal in said control module to effect vehicle operation when said vehicle is traveling below a predetermined low velocity and when the vehicle is stopped, based on said signals provided.

* * * * *